US012645661B2

(12) United States Patent
Mayr et al.

(10) Patent No.: US 12,645,661 B2
(45) Date of Patent: *Jun. 2, 2026

(54) TABLE SCAN PREDICATE WITH INTEGRATED SEMI-JOIN FILTER

(71) Applicant: SAP SE, Walldorf (DE)

(72) Inventors: Manuel Mayr, Walldorf (DE);
Wolfgang Stephan, Heidelberg (DE);
Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/817,669

(22) Filed: Aug. 28, 2024

(65) Prior Publication Data

US 2024/0419650 A1 Dec. 19, 2024

Related U.S. Application Data

(63) Continuation of application No. 17/751,296, filed on May 23, 2022, now Pat. No. 12,099,490.

(51) Int. Cl.
*G06F 16/22* (2019.01)
*G06F 16/242* (2019.01)
*G06F 16/2455* (2019.01)

(52) U.S. Cl.
CPC ........ *G06F 16/2282* (2019.01); *G06F 16/221* (2019.01); *G06F 16/2237* (2019.01); *G06F 16/2428* (2019.01); *G06F 16/2456* (2019.01)

(58) Field of Classification Search
CPC .................................................... G06F 16/2282
USPC ......................................................... 707/714
See application file for complete search history.

(56) References Cited

U.S. PATENT DOCUMENTS

| | | | | |
|---|---|---|---|---|
| 10,726,010 B2 * | 7/2020 | Ahmed | ............. | G06F 16/24544 |
| 2020/0320048 A1 * | 10/2020 | Horn | ................... | G06F 16/2291 |
| 2021/0397619 A1 * | 12/2021 | Heimel | ............... | G06F 16/2272 |
| 2023/0117461 A1 * | 4/2023 | Pasupuleti | .......... | G06F 16/2453 707/721 |

* cited by examiner

*Primary Examiner* — Syling Yen
(74) *Attorney, Agent, or Firm* — Mintz Levin Cohn Ferris Glovsky and Popeo, P.C.

(57) ABSTRACT

A table scan predicate with integrated semi-join filter is provided. A method includes receiving a query including: a request to join first data from a first table and second data from a second table, a first predicate for use in a table scan of the second table, and a second predicate including an expression associated with the first data from the first table and a reference to a column associated with the second data from the second table. The method may include transforming the second predicate into a dynamic predicate for execution of the query. the method may include applying the dynamic predicate to at least the first data. The method may include executing the query by at least scanning the second table based on the first predicate and filtered first data from the application of the dynamic predicate. Related systems and articles of manufacture are provided.

20 Claims, 6 Drawing Sheets

200

202

204

206

208

250

| S | | | |
|---|---|---|---|
| | X | Y | Z |
| A | | | |
| B | | | |
| C | | | |
| D | | | |

252

| T | | | |
|---|---|---|---|
| | I | T. col | J |
| E | | | |
| F | | | |
| G | | | |
| H | | | |

700

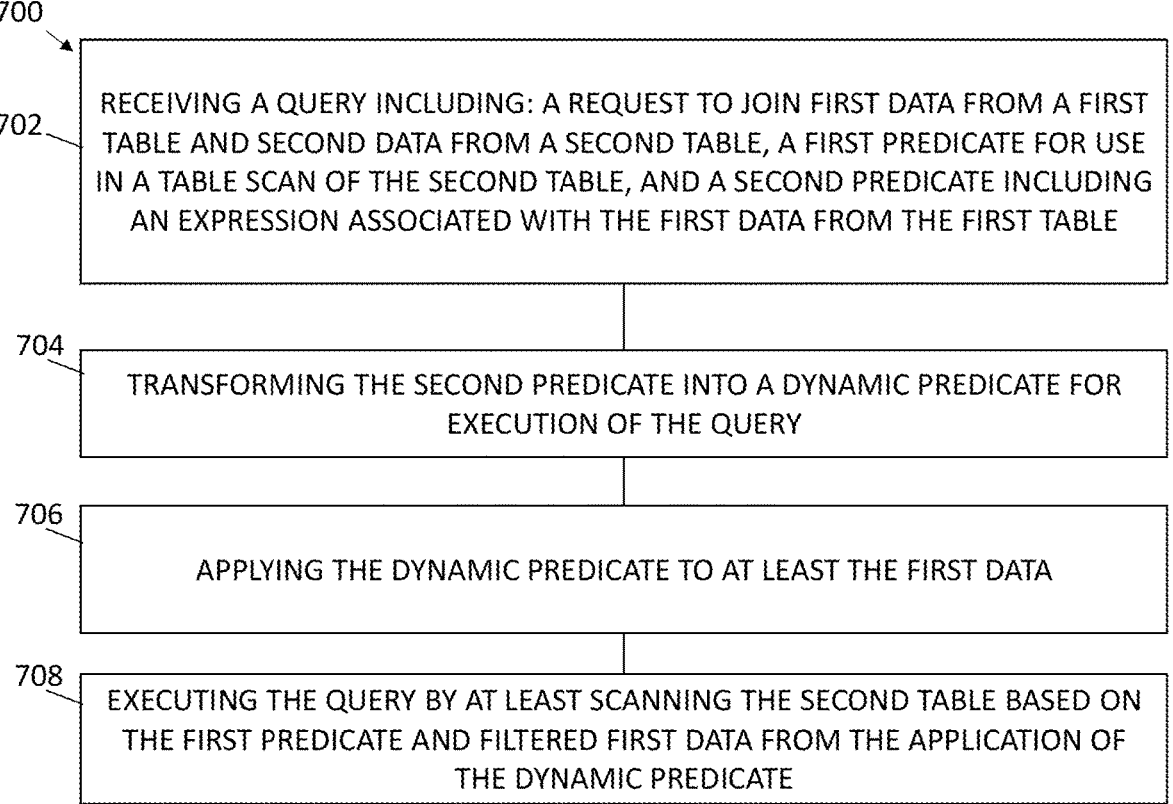

702 — RECEIVING A QUERY INCLUDING: A REQUEST TO JOIN FIRST DATA FROM A FIRST TABLE AND SECOND DATA FROM A SECOND TABLE, A FIRST PREDICATE FOR USE IN A TABLE SCAN OF THE SECOND TABLE, AND A SECOND PREDICATE INCLUDING AN EXPRESSION ASSOCIATED WITH THE FIRST DATA FROM THE FIRST TABLE

704 — TRANSFORMING THE SECOND PREDICATE INTO A DYNAMIC PREDICATE FOR EXECUTION OF THE QUERY

706 — APPLYING THE DYNAMIC PREDICATE TO AT LEAST THE FIRST DATA

708 — EXECUTING THE QUERY BY AT LEAST SCANNING THE SECOND TABLE BASED ON THE FIRST PREDICATE AND FILTERED FIRST DATA FROM THE APPLICATION OF THE DYNAMIC PREDICATE

TABLE SCAN PREDICATE WITH INTEGRATED SEMI-JOIN FILTER

CROSS REFERENCE TO RELATED APPLICATIONS

This application is a continuation of U.S. patent application Ser. No. 17/751,296 filed May 23, 2022, entitled "TABLE SCAN PREDICATE WITH INTEGRATED SEMI-JOIN FILTER." The disclosure of which is incorporated herein by reference in its entirety.

TECHNICAL FIELD

The subject matter described herein relates generally to database management and more specifically to a table scan predicate with an integrated semi-join filter for use in a semi-join reduction.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for a table scan predicate with an integrated semi-join filter for use in a semi-join reduction. In one aspect, there is provided a system. The system may include at least one data processor and at least one memory. The at least one memory may store instructions that result in operations when executed by the at least one data processor. The operations may include: receiving a query including a request to join first data from a first table and second data from a second table, a first predicate for use in a table scan of the second table, and a second predicate including an expression associated with the first data from the first table and a reference to a column associated with the second data from the second table. The operations may also include transforming the second predicate into a dynamic predicate for execution of the query. The operations may also include applying the dynamic predicate to at least the first data. The applying may include: collecting the first data based on the expression, and filtering the column associated with the second data from the second table based on a value identifier mapped to at least one vector of data representing the collected first data. The operations may include executing the query by at least scanning the second table based on the first predicate and the filtered column.

In some variations, the transforming includes: converting the second predicate to a child node of the table scan. The table scan is configured to perform the scanning of the second table.

In some variations, the transforming further includes including the first predicate as a second child node of the table scan in conjunction with the dynamic predicate.

In some variations, the collecting comprises parallelizing the first data. The applying further includes merging, after the collecting, the first data.

In some variations, the merging includes uniquifying the first data.

In some variations, the uniquifying includes removing duplicate values from the at least one vector of data.

In some variations, the filtering includes removing, from the second table, at least one row that does not correspond to the value identifier.

In some variations, the dynamic predicate is implemented as a semi-join reduction to reduce a number of rows in at least the second table for use in the scanning of the second table.

In some variations, a computer-implemented method includes: receiving a query including a request to join first data from a first table and second data from a second table, a first predicate for use in a table scan of the second table, and a second predicate including an expression associated with the first data from the first table and a reference to a column associated with the second data from the second table. The method may also include transforming the second predicate into a dynamic predicate for execution of the query. The method may also include applying the dynamic predicate to at least the first data. The applying may include: collecting the first data based on the expression, and filtering the column associated with the second data from the second table based on a value identifier mapped to at least one vector of data representing the collected first data. The method may include executing the query by at least scanning the second table based on the first predicate and the filtered column.

In some variations, the transforming includes: converting the second predicate to a child node of the table scan. The table scan is configured to perform the scanning of the second table.

In some variations, the transforming further includes including the first predicate as a second child node of the table scan in conjunction with the dynamic predicate.

In some variations, the collecting includes parallelizing the first data. The applying further includes merging, after the collecting, the first data.

In some variations, the merging includes uniquifying the first data.

In some variations, the uniquifying includes removing duplicate values from the at least one vector of data.

In some variations, the filtering includes removing, from the second table, at least one row that does not correspond to the value identifier.

In some variations, the dynamic predicate is implemented as a semi-join reduction to reduce a number of rows in at least the second table for use in the scanning of the second table.

In some variations, a non-transitory computer-readable medium storing instructions, which when executed by at least one data processor, result in operations including: receiving a query including a request to join first data from a first table and second data from a second table, a first predicate for use in a table scan of the second table, and a second predicate including an expression associated with the first data from the first table and a reference to a column associated with the second data from the second table. The operations may also include transforming the second predicate into a dynamic predicate for execution of the query. The operations may also include applying the dynamic predicate to at least the first data. The applying may include: collecting the first data based on the expression, and filtering the column associated with the second data from the second table based on a value identifier mapped to at least one vector of data representing the collected first data. The operations may include executing the query by at least scanning the second table based on the first predicate and the filtered column.

In some variations, the transforming includes: converting the second predicate to a child node of the table scan. The table scan is configured to perform the scanning of the second table.

In some variations, the transforming further includes including the first predicate as a second child node of the table scan in conjunction with the dynamic predicate.

In some variations, the collecting comprises parallelizing the first data. The applying further includes merging, after the collecting, the first data.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

In the drawings,

FIG. 7 depicts a flowchart illustrating a process for executing a query, in accordance with some example embodiments.

When practical, similar reference numbers denote similar structures, features, or elements.

DETAILED DESCRIPTION

Figure 1:
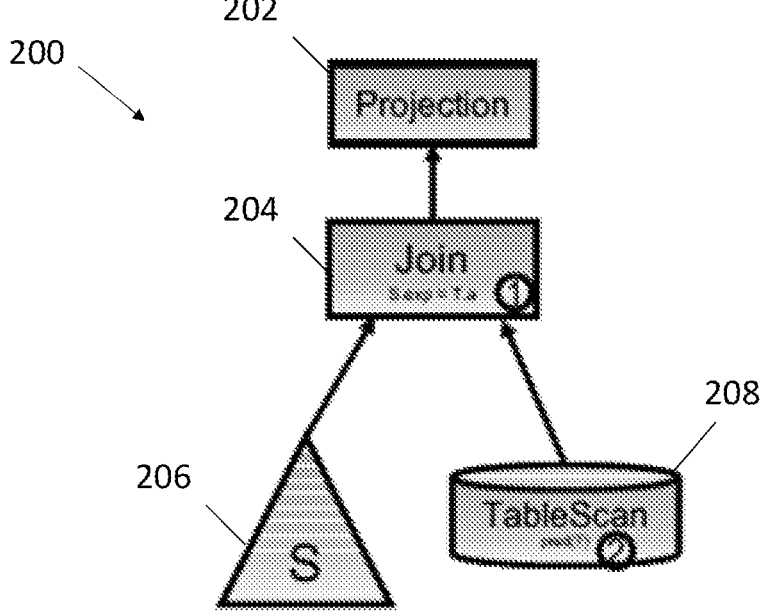
FIG. 1 depicts an example logical representation of a query, in accordance with some example embodiments.

Database management systems and operations performed on the data managed by a database management system have become increasingly complex. For example, a database management system (or database for short) can support relatively complex online analytical processing (OLAP, which can perform multi-dimensional analysis) to more straightforward transaction based online transaction processing (OLTP). Moreover, the database may be configured as a row-store database or column-store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

Joining methods may be used in query processing for distributed databases. When processing queries in distributed databases, data needs to be transferred between databases located in different sites. Such join operations can be computationally expensive depending on the amount of data that needs to be transferred. Thus, query optimization can be used to minimize the amount of data transferred between sites and processed during execution of the queries.

To optimize execution of the query, and to reduce the amount of data scanned and/or transferred between sites during join operations, semi-join reduction techniques may be used. For example, a semi-join may be used for processing a join between tables more quickly. In particular, a left-semi-join may be used to return rows in a left table (e.g., a left side of the predicate) of a join at most once. In other words, even if the right table (e.g., a right side of the predicate) of the join contains two matches for a row in the left table, only one copy of the row from the left table will be returned. Thus, processing a semi-join may include searching the right table for matches in the left table and returning only a single row from the left table for each of the matches without duplicates.

For semi-joins involving tables stored at different sites (e.g., hosts), data transfer cost may be reduced by first sending only the projected join column(s) to the other site, where it is joined with the second relational table. Then, all matching tuples from the second relation are sent back to the first site to compute the final join result.

As an example, a query may include a request (e.g., S∞T) to join tables S and T. Semi-join reduction techniques can eliminate dangling tuples from table T to more efficiently and/or quickly process the request with less computing resources. A dangling tuple may include a tuple (e.g., a row in a table) that does not match with any tuple in table T. In relational algebra, this is captured by the following law: (S∝T)∞T=S∞T. The operation S∝T (e.g., table S left semi-join table T) in this context is an operation to eliminate every tuple in table T that does not have a matching (e.g., a corresponding) row in table S. Depending on the query predicates and/or the query criteria, this operation may be computationally cheap and may greatly reduce the number of tuples from table S that are considered during execution of the request to join tables S and T (e.g., the join operation).

Generally, bloom filters have been used to further reduce the computational resources needed to process queries including a join and for accomplishing the semi-join reduction. Bloom filters are probabilistic data structures that employ a bit vector to test membership in a set. Thus, bloom filters may efficiently perform semi-join reductions to aid in processing a join. However, since bloom filters are probabilistic structures, and even though bloom filters do not produce false negatives (e.g., the bloom filters do not remove tuples that should have remained), bloom filters still produce false positives. As a result, bloom filters may still leave at least some tuples for consideration that could have otherwise been removed, such as from table T. Accordingly, bloom filters may not provide maximum efficiency in all instances.

Consistent with embodiments of the current subject matter, the database management system described herein may maximize efficiency in semi-join reduction to aid in processing queries, such as queries that include a join operation. The database management system may generate and use a dynamic predicate (e.g., a table scan predicate with integrated semi-join filter) that is injected into existing predicates of a table scan, such as by using a conjunction. This allows for column store-specific optimization such as for value identifier (e.g., valueid) processing. The dynamic predicate described herein may include at least one value list (e.g., ValueList) operator that considers values that are not known at compile time, but are gathered at query execution time. For example, the dynamic predicate may be applied to the data stored in the table by at least collecting values from an expression included in the query and by filtering a column in one of the tables based on value identifiers corresponding to the collected values. The database management system may thus pre-filter the data scanned during execution of the query. Accordingly, the database management system described herein may improve query processing speeds and efficiency.

FIG. 1 depicts an example logical representation 200 of a query, in accordance with some example embodiments. In some embodiments, a database management system 100 (see FIG. 8) may include an execution engine 150 that may be configured to receive the query, generate a query plan (including for example query algebra) which may be depicted by the logical representation 200, optimize the query plan, and/or generate executable code, as discussed herein, and discussed in more detail with respect to FIG. 8. The database management system 100 may also include a query optimizer 110 and/or a query execution engine 112 that performs one more operations of a query, such as before or during execution of a query execution plan. The query optimizer 110 and/or the query execution engine 112 (which may include pre-compiled code and/or generated executable code) may define an application that is part of or separate from the execution engine 150 that handles processing of the query.

Figure 8:
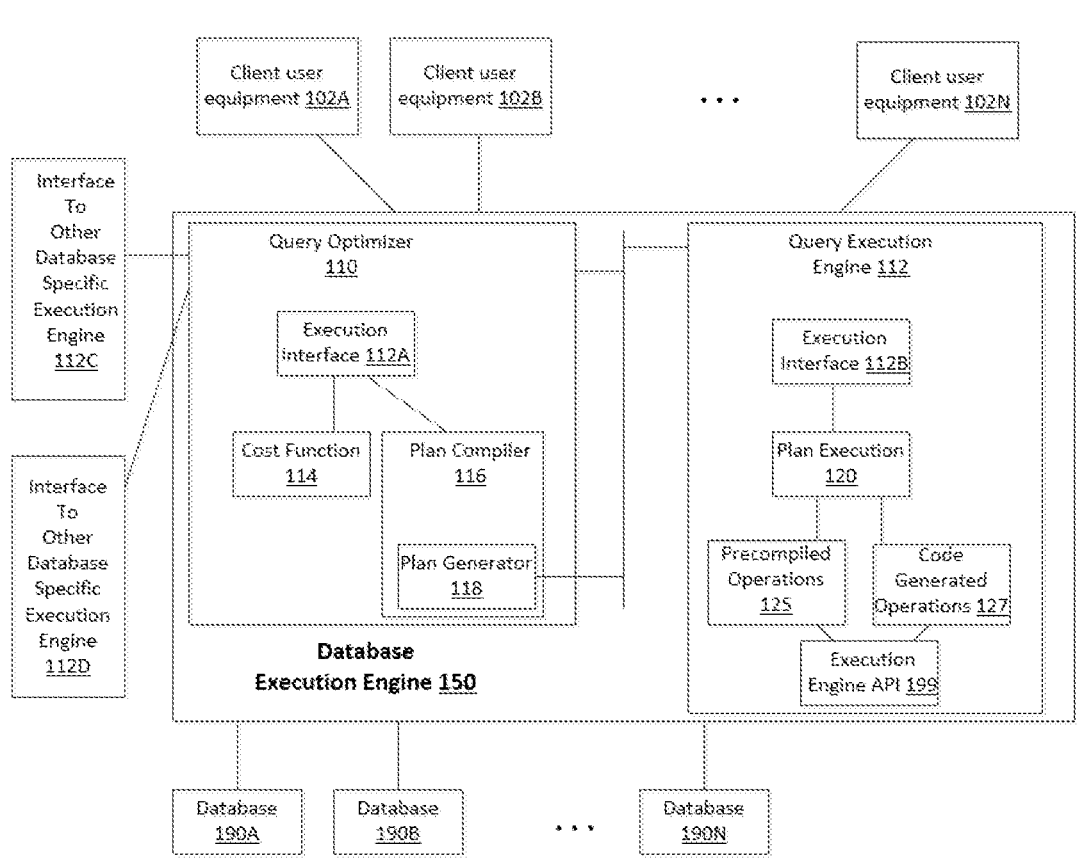
FIG. 8 depicts another block diagram for a system, in accordance with some example embodiments.

Referring to FIG. 8, the database management system 100 may include at least one table stored on a database (e.g., databases 190A-N). The database management system 100 may receive, from client equipment 102A, 102B, the query for execution. The query may include a request to join first data from a first table stored on a first database, such as the databases 190A-N, and second data from a second table stored on a second database (which may be the same as or different from the first database), such as the databases 190A-190N.

As noted above, the query may include a request to join first data from a first table and second data from a second table. The query may include at least one predicate, such as one, two, three, four, or more predicates, that are used for processing the request. A predicate of the query defines a logical condition or expression included in a query. The predicate may be an expression (e.g., a Boolean expression), a condition, a keyword that specifies a relationship between two expressions, and/or the like that is applied to rows in a table. In other words, the predicate may determine which rows of a table are relevant to a particular query, such as to the request to join the first data and the second data.

The query may include at least a first predicate and a second predicate, among other predicates. The first predicate may include any arbitrary predicate, such as a predicate that is used for a table scan of at least one of the first table and the second table. The second predicate may include an expression, such as a query expression, associated with the first data from the first table and/or the second data from the second table. Additionally, and/or alternatively, the second predicate may include a reference to a column associated with the first data from the first table and/or the second data from the second table.

An example query is included below:

| SELECT | * |
| --- | --- |
| FROM | query AS S JOIN T |
| ON | S.exp = T.col |
| WHERE | pred(T); |

The example query includes a join operator (e.g., a request to join first data from a first table and second data from a second table). While FIGS. 1-6 are described with respect to the example query, other queries, such as queries including join operators may be processed by the database management system 100 using the same and/or similar described methods and/or techniques.

Figures 2, 3:
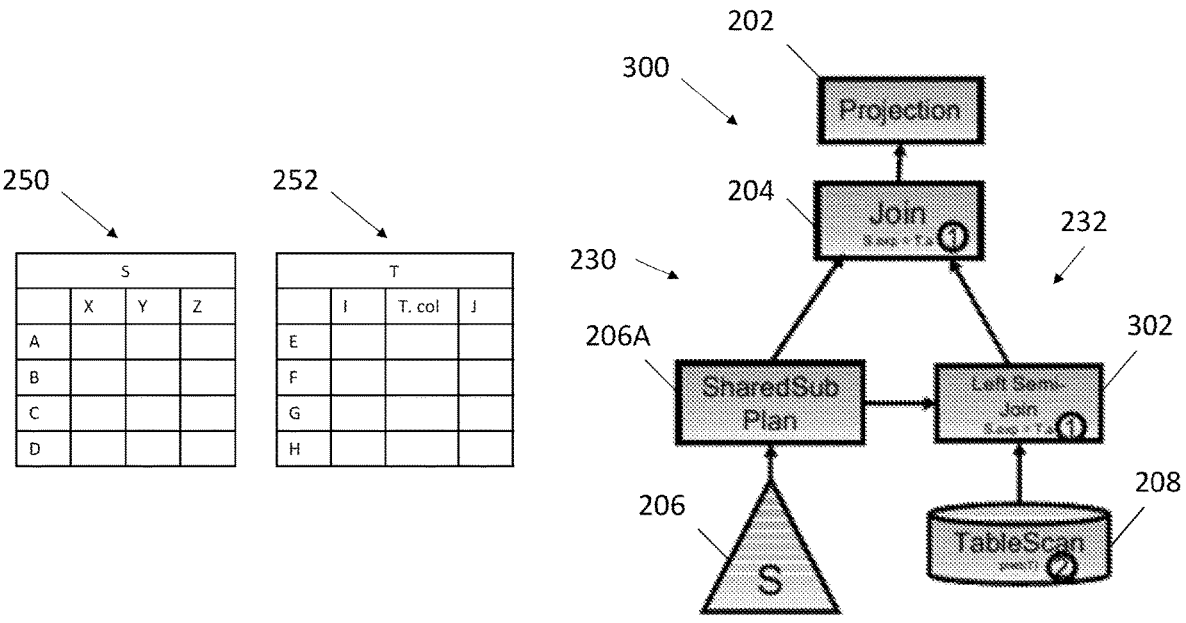
FIG. 2 depicts example tables for use in execution of a query, in accordance with some example embodiments.
FIG. 3 depicts an example transformation of a logical representation of a query, in accordance with some example embodiments.

As shown in FIG. 1, which depicts a logical representation 200 of the query, and with reference to the above example query, the query includes, at 204, a request (e.g., SELECT*FROM query AS S JOIN T) to join first data from a first table S (e.g., a first table 250 shown in FIG. 2 as a left table) and second data from a second table T (e.g., a second table 252 shown in FIG. 2 as a right table). The join, at 204, may include a join operator, such as an inner join, an outer join, and/or the like. The join, at 204, may additionally and/or alternatively include a hash join (see FIG. 4). The request to join the first data from the first table S and second data from the second table T may be used in a projection at 202. The first data from the first table S and/or the second data from the second table T may be provided via a sub plan S, at 206, of the query plan used to execute the query.

The example query includes a first predicate and a second predicate. The first predicate in this example is in the WHERE clause. For example, the first predicate includes "pred(T)," which is an arbitrary predicate, such as an expression, a condition, or the like, on the second table T. The first predicate, which in this case is part of the SELECT statement's WHERE clause, may be used to determine which rows in the first table S and/or the second table T that are relevant to execution of the query. The first predicate may be used during a table scan of the second table T. For example, as shown in FIG. 1, the table scan at 208 may be based on at least the first predicate of the query. The table scan may be used to scan the table T for rows that are relevant to the join operation of the query, based on the first predicate.

Referring to the example query, the second predicate may include: "ON S.exp T.col." Thus, the second predicate may include an expression (e.g., S.exp) associated with the first table S. The second predicate may also include a reference to a column (e.g., T.col) associated with the second data from the second table T. In some embodiments, the column is a join column that is used to join the first table S and the second table T. Thus, the second predicate, which in this case is part of the ON clause, may be used to determine which rows in the first table S and/or the second table T that are relevant to the join operation, such as at 204.

FIG. 3 depicts a first example transformation 300 of the logical representation 200 of the query shown in FIG. 2, in accordance with some example embodiments. The database management system 100 may employ a semi-join reduction technique using the dynamic predicate consistent with embodiments of the current subject matter to maximize efficiency in processing the query, such as the example query including a join, such as at 204. To implement the semi-join reduction technique consistent with embodiments of the current subject matter, the logical representation 200 has been transformed to include a semi-join at 302 and a shared sub plan at 206A. The inclusion of the semi-join at 302 allows for the semi-join reduction to be implemented by the database management system 100.

The shared sub plan at 206A is an extension of the sub plan at 206 that is a view in front of the sub plan that includes semantics for all data flowing from the sub plan at 206 into a build side 230 and/or a probe side 232 of the query plan. On the build side 230, one or more hash tables may be used as auxiliary structures to facilitate matching of rows between the first table S and the second table T on the probe side 232. Because the probe side 232 is more computationally expensive than the build side 230, the database management system 100 applies the semi-join reduction consistent with embodiments of the current subject matter to filter and/or reduce the number of rows that are scanned as part of the processing of the query.

Referring to FIG. 3, the semi-join at 302 may include a left semi-join, a right semi-join, and/or the like. The semi-join may be based on the second predicate. For example, as described herein with respect to the join at 204, the second predicate may include an expression (e.g., S.exp) associated with the first table S. The second predicate may also include a reference to a column (e.g., T.col) associated with the second data from the second table T. In some embodiments, the column is a join column that is used in the semi-join at 302. Thus, the second predicate, which in this case is part of the ON clause, may be used to determine which rows in the first table S and/or the second table T that are relevant to the semi-join operation, such as at 302.

Figures 4, 5:
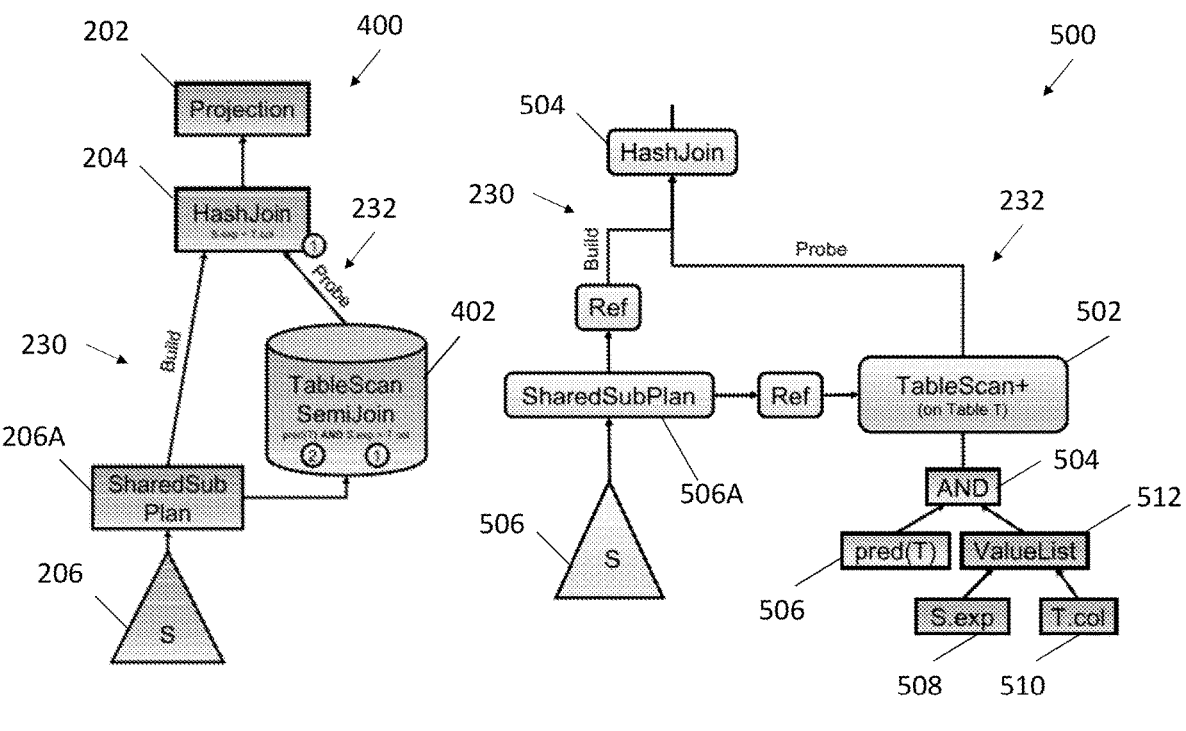
FIG. 4 depicts an example transformation of a logical representation of a query, in accordance with some example embodiments.
FIG. 5 depicts an example transformed algebraic representation of a query including a dynamic predicate, in accordance with some example embodiments.

FIG. 4 depicts a second example transformation 400 of the logical representation 200 of the query shown in FIG. 2. The second example transformation 400 is a further transformation of the logical representation 200, based on the first example transformation 300, in accordance with some example embodiments. As shown in FIG. 4, the table scan at 208 and the semi-join at 302 have been combined into a table scan semi-join operator at 402. To generate the combined table scan semi-join operator at 402, the second predicate (e.g., S.exp=T.col) may be transformed into a dynamic predicate (e.g., table scan predicate with integrated semi-join filter) for execution of the query, as described in more detail below.

FIG. 5 depicts an example transformed algebraic representation 500 of the query, further illustrating the transformation of the second predicate into the dynamic predicate (e.g., table scan predicate with integrated semi-join filter), in accordance with some example embodiments. The algebraic representation 500 corresponds to the example transformation 400. For example, a sub plan at 506, a shared sub plan at 506A, and a hash join at 504 correspond to the sub plan at 206, the shared sub plan at 206A, and the hash join at 204, respectively. In other words, the sub plan at 506, the shared sub plan at 506A, and the hash join at 504 are algebraic representations of the sub plan at 206, the shared sub plan at 206A, and the hash join at 204, respectively. As such, the sub plan at 506, the shared sub plan at 506A, and the hash join at 504 have the same properties and/or components as the sub plan at 206, the shared sub plan at 206A, and the hash join at 204, respectively.

Referring to FIG. 5, the table scan semi-join at 402 is algebraically represented by the table scan+(e.g., TableScan+) at 502. As further shown in FIG. 5, the second predicate of the query has been transformed into the dynamic predicate at 512. For example, the second predicate has been converted to a child node (at 512) of the table scan at 502. The first predicate (e.g., pred(T)) of the query has also been converted to a child node at 506 in conjunction with the dynamic predicate. For example, the first predicate at 506 and the dynamic predicate at 512 may be child nodes of the table scan at 502 and may be combined using a conjunction at 504 by, for example, using an AND clause.

Again referring to FIG. 5, the dynamic predicate at 512 is shown as a value list (e.g., ValueList) operator. The value list operator returns a list of all the values, for a given column within the query, delimited by the given value. Using the example query provided above, the value list operator at 512 may be written as: ValueList (S.exp, T.col). The database management system 100 may execute the value list operator at 512 to collect all values from expression S.exp at 508 and filter T.col at 510 based on the values. While T.col denotes a column from the second table T, where the table scan at 502 is performed, S.exp may, in some embodiments, be an arbitrary expression. In this way, the value list operator at 512 may resemble an IN-List predicate, which may include T.b IN (e1, e2, . . . , en), where e1, e2, . . . , en are not known at compile time but gathered at query execution time.

In some implementations, the first data from the first table and the second data from the second table may be represented by at least one vector of data. For example, data of the first data from the first data table and/or the second data from the second data table may be stored in a row of a corresponding one of the first table or the second table as a vector of data. The vector of data may include a plurality of values, such as numerical and/or integer values. For example, every column of the first table and/or the second table may be represented as a data vector of length "table size". Each row of the first table and/or the second table is a tuple including one entry from the data vector of each column. The tuple may include and/or represent the vector of data. As an example, to find the value for a certain column of row #100, the data vector of that certain column is searched at position 100. Thus, each row of the first table and/or the second table may include a tuple (or a vector of data) representing at least some of the first data and/or the second data, respectively, that is an entry from the data vector of at least one column in the respective one of the first table and/or the second table.

The at least one vector of data may correspond to a value identifier (also referred to herein as valueIds or VIDs). For example, in a database (e.g., the databases 190A-N), such as a column-store database or a column-oriented database, and/or one or more tables stored on the database, such as the first table S (e.g., the first table 250) and/or the second table T (e.g., the second table 252), the data values represented by vectors of data in the columns of a table may be compressed using a dictionary or dictionary encoding. Generally, the dictionaries include columns that store the actual data. The columns of the first table S and/or the second table T may be represented as a data vector, which may store index values that reference the dictionaries. These index values may be the value identifiers, which may include numeric values and/or identifiers that include a numeric value, that map onto the data vectors so it is not necessary to search first data and/or the second data itself, which would be cumbersome and computationally expensive. Instead, a column of the dictionary may be a list of index values (e.g., the value identifiers). Each value identifier in the column represents a position in the dictionary. For example, a value identifier with a value of "5" points to a sixth value in the corresponding dictionary, since the value identifiers begin with the value "0" pointing to a first value in the corresponding dictionary. The database management system 100 may maintain a mapping, such as via the dictionary, between the vectors of data representing the first data and/or the second data, and value identifiers that correspond to each of the vectors of data.

Figure 6:
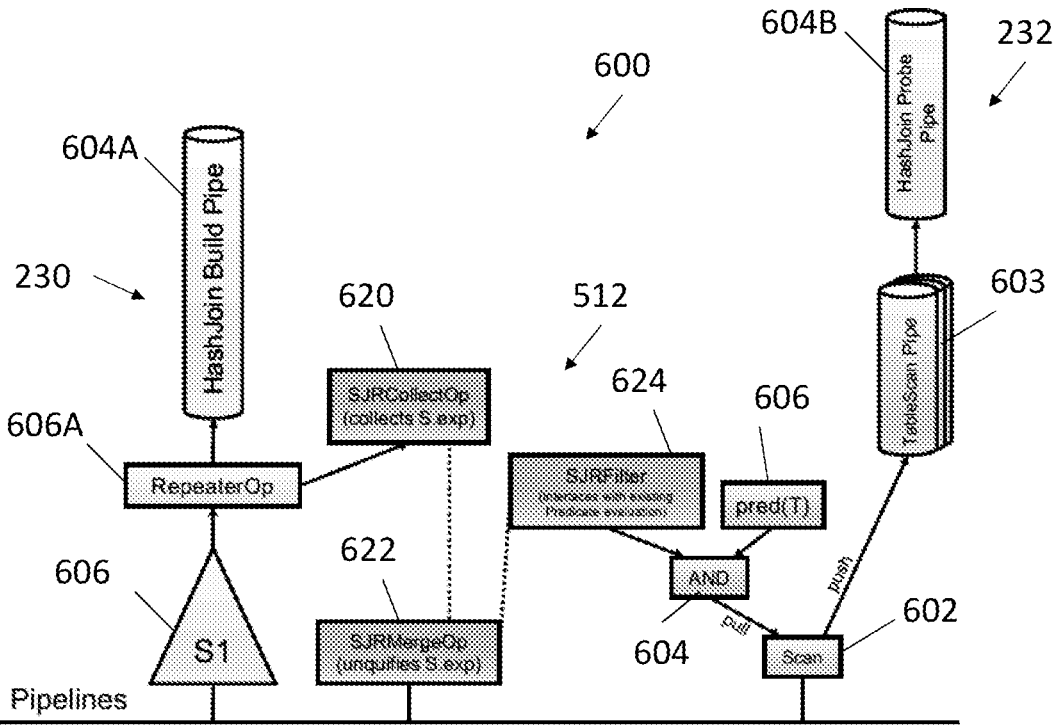
FIG. 6 depicts an example transformed algebraic representation of a query including a dynamic predicate, in accordance with some example embodiments.

FIG. 6 depicts an example transformed algebraic representation 600 of the query that has been further expanded, in accordance with some example embodiments. For example, FIG. 6 shows an example pipeline architecture of the database management system 100, such as inside the execution engine 150. Referring to FIG. 6, the representation 600 includes a sub plan S1 at 606 and a repeater operator (e.g., RepeaterOp) at 607 that correspond to the sub plan at 506 and the shared sub plan at 506A, respectively. The repeater operator at 606A receives data from the sub plan at 606. From the repeater operator at 606A, data (e.g., the first data and/or the second data) flows to the build side 230 and/or towards the probe side 232. At the build side 230, the data flows from the repeater operator at 606A to the hash join build pipeline at 604A where the data is used for building hash tables for the hash join.

FIG. 6 illustrates an expansion of the dynamic predicate (e.g., the value list operator at 512). The dynamic predicate may include a collection operator (e.g., SJRCollectOp) at 620, a merge operator (e.g., SJRMergeOp) at 622, and/or a filter operator (e.g., SJRFilter) at 624. The collection operator at 620 collects the data flowing from the repeater operator at 606A towards the probe side 232. For example, the collection operator at 620 collects at least the first data from the first table S based on the expression (e.g., S.exp) included in the query, such as in the second predicate of the query.

In some embodiments, the collection operator at 620 parallelizes the collected data for further processing. For example, the collection operator at 620 may parallelize the data to improve processing speeds and efficiency. Parallelizing the data may allow for parallel processing of the data, which increases the processing speeds The merge operator at 622 may receive the parallelized data from the collection operator at 620. The merge operator at 622 may merge the parallelized data. Merging the parallelized data allows for the parallelized data to be further processed before it is filtered. The merged data may be stored in a temporary store. The merge operator at 622 may additionally and/or alternatively uniquify the merged data, which allows for faster filtering of the data. The merged data may be uniquified by removing duplicate values from each vector of data representing the data (e.g., the first data and/or the second data from the first table and/or the second table, respectively). For example, a vector of data may include: <1 1 2 2 4>. After uniquifying the vector of data, the vector of data may include: <1 2 4>. Thus, the duplicate values from each vector of data may be removed. While the term uniquify is used herein, uniquifying the data may also be referred to herein as duplicate elimination or eliminating duplicates in the vector of data.

In some embodiments, the vectors of data may be mapped to value identifiers, as described herein. For example, as described herein, the database management system 100 may maintain a mapping between the vectors of data representing the first data and/or the second data and a corresponding value identifier stored in a data vector (e.g., a list of the value identifiers). Each value identifier may indicate a position (e.g., a row) in a dictionary in which the corresponding vectors of data is stored. In some embodiments, the merge operator back maps the value identifiers to the corresponding vectors of data.

Referring again to FIG. 6, the filter operator at 624 filters at least the column (e.g., T.col from the second predicate of the query) associated with the second data from the second table T based on a value identifier mapped to at least one vector of data representing the merged data (e.g., the merged first data). The column may be filtered by removing, from the second table T, at least one row that does not correspond to the value identifier based on which the filtering is performed. Thus, at least one row may be removed from the second table T without reading all of the data represented by each vector of data stored in the first table. Rather, the filter operator at 624 may search only the value identifiers associated with each vector of data. In other words, the filter operator at 624 may request, from the data store containing at least the second table T all rows containing data corresponding to at least one value identifier. This allows for dangling tuples to be quickly and efficiently removed from the second table T, which in turn reduces the number of rows from the second table T that are considered by the database management system 100 during execution of the query. Configurations of the database management system 100 described herein reduce processing speeds and improves processing efficiency for queries, such as queries including a join operator.

In some embodiments, the query may include multiple predicates that may be transformed to a dynamic predicate. In such embodiments, the dynamic predicate may include a plurality of value list operators corresponding to each value identified in the query. In this example, the expression S.exp may refer to multiple columns from different tables. This may allow for efficient operations in data warehouse scenarios, where data is organized in star-schema, snowflake-schema, and/or the like.

Again referring to FIG. 6, the database management system 100 (e.g., via the execution engine 150) may execute the query by at least scanning the second table T (and/or the first table S) based on the first predicate (e.g., pred(T)) and the filtered column. For example, the execution engine 150 may scan at 602 using a table scan at least the second table T based on a conjunction (e.g., AND) at 604 of the filtered column from the filter operator at 624, and the first predicate at 606. Thus, the dynamic predicate is implemented as an efficient semi-join reduction that reduces a number of rows in at least the second table T for use in scanning of the second table T. The scan may be pushed to a table scan pipeline (e.g., TableScan Pipe) at 603, and to the hash join probe side pipeline (e.g., HashJoin Probe Pipe) at 604B for use in the hash join.

FIG. 7 depicts a flowchart illustrating a process 700 for processing queries using a table scan predicate with integrated semi-join filter, in accordance with some example embodiments. Referring to FIGS. 1-6, one or more aspects of the process 700 may be performed by the execution engine 150, and/or another component of the database management system 100. As described herein, the database management system 100 helps to efficiently execute a query, such as when the query includes a request to join data from two tables, and/or a semi-join reduction is desired.

At 702, the database management system 100 (e.g., the execution engine 150) may receive a query. The query may include a request to join first data from a first table and second data from a second table. For example, the query may include a join operator. The query may additionally and/or alternatively include a first predicate and a second predicate. The first predicate may be used for a table scan of the second table. The second predicate may include an expression (e.g., a query expression) associated with the first data from the first table and/or a reference to a column associated with the second data from the second table.

At 704, the database management system 100 (e.g., the execution engine 150) may transform the second predicate into a dynamic predicate for execution of the query. For example, the dynamic predicate may be based on values that are not available at the time the query is received, but may be available at the time of query execution. The second predicate may be transformed to the dynamic predicate by converting the second predicate to a child node of the table scan, which as described herein scans the second table. In some embodiments, the first predicate may also be included as a second child node of the table scan. The first predicate and the second predicate may be combined using a conjunction (e.g., an AND conjunction) for use during the table scan.

At 706, the database management system 100 (e.g., the execution engine 150) may apply the dynamic predicate to at least the first data. For example, the dynamic predicate may be applied to at least the first data references by the expression included in the query, such as in the second predicate of the query. The dynamic predicate may be applied to at least the first data by collecting the first data based on the expression. For example, the first data, such as the portion of the first data relevant to the expression may be collected. The collected data may be parallelized to improve data processing speed.

Additionally and/or alternatively, the execution engine 150 may apply the dynamic predicate by merging the first data. The first data may be merged after the collecting. First data may be merged by at least uniquifying the first data. For example, the first data may be uniquified by removing duplicate values from at least one vector of data representing the first data. This allows for the at least one vector of data to include unique values that are easier to process.

Additionally and/or alternatively, the execution engine 150 may apply the dynamic predicate by filtering the column associated with the second data from the second table. The execution engine 150 may filter the column based on a value identifier mapped to the at least one vector of data representing the merged first data. For example, the execution engine 150 may remove at least one row from the second table that does not correspond to the desired value identifier. This allows for dangling tuples to be quickly and efficiently removed.

At 708, the database management system 100 (e.g., the execution engine 150) may execute the query by at least scanning the second table based on the first predicate and the filtered column. The dynamic predicate may be implemented as a semi-join reduction to reduce a number of rows in at least the second table for use in the scanning of the second table.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory result in operations comprising: receiving a query including: a request to join first data from a first table and second data from a second table; a first predicate for use in a table scan of the second table; and a second predicate including an expression associated with the first data from the first table and a reference to a column associated with the second data from the second table; transforming the second predicate into a dynamic predicate for execution of the query; applying the dynamic predicate to at least the first data, wherein the applying comprises: collecting the first data based on the expression; and filtering the column associated with the second data from the second table based on a value identifier mapped to at least one vector of data representing the collected first data; and executing the query by at least scanning the second table based on the first predicate and the filtered column.

Example 2: The system of example 1, wherein the transforming comprises: converting the second predicate to a child node of the table scan, wherein the table scan is configured to perform the scanning of the second table.

Example 3: The system of example 2, wherein the transforming further comprises including the first predicate as a second child node of the table scan in conjunction with the dynamic predicate.

Example 4: The system of any one of examples 1 to 2, wherein the collecting comprises parallelizing the first data; and wherein the applying further comprises merging, after the collecting, the first data.

Example 5: The system of example 4, wherein the merging comprises uniquifying the first data.

Example 6: The system of example 5, wherein the uniquifying comprises removing duplicate values from the at least one vector of data.

Example 7: The system of any one of examples 1 to 6, wherein the filtering comprises removing, from the second table, at least one row that does not correspond to the value identifier.

Example 8: The system of any one of examples 1 to 7, wherein the dynamic predicate is implemented as a semi-join reduction to reduce a number of rows in at least the second table for use in the scanning of the second table.

Example 9: A computer-implemented method comprising: receiving a query including: a request to join first data from a first table and second data from a second table; a first predicate for use in a table scan of the second table; and a second predicate including an expression associated with the first data from the first table and a reference to a column associated with the second data from the second table; transforming the second predicate into a dynamic predicate for execution of the query; applying the dynamic predicate to at least the first data, wherein the applying comprises: collecting the first data based on the expression; and filtering the column associated with the second data from the second table based on a value identifier mapped to at least one vector of data representing the collected first data; and executing the query by at least scanning the second table based on the first predicate and the filtered column.

Example 10: The method of example 9, wherein the transforming comprises: converting the second predicate to a child node of the table scan, wherein the table scan is configured to perform the scanning of the second table.

Example 11: The method of example 10, wherein the transforming further comprises including the first predicate as a second child node of the table scan in conjunction with the dynamic predicate.

Example 12: The method of any one of examples 9 to 11, wherein the collecting comprises parallelizing the first data; and wherein the applying further comprises merging, after the collecting, the first data.

Example 13: The method of example 12, wherein the merging comprises uniquifying the first data.

Example 14: The method of example 13, wherein the uniquifying comprises removing duplicate values from the at least one vector of data.

Example 15: The method of any one of examples 9 to 14, wherein the filtering comprises removing, from the second table, at least one row that does not correspond to the value identifier.

Example 16: The method of any one of examples 9 to 15, wherein the dynamic predicate is implemented as a semi-join reduction to reduce a number of rows in at least the second table for use in the scanning of the second table.

Example 17: A non-transitory computer-readable medium storing instructions, which when executed by at least one data processor, result in operations comprising: receiving a query including: a request to join first data from a first table and second data from a second table; a first predicate for use in a table scan of the second table; and a second predicate including an expression associated with the first data from the first table and a reference to a column associated with the second data from the second table; transforming the second predicate into a dynamic predicate for execution of the query; applying the dynamic predicate to at least the first data, wherein the applying comprises: collecting the first data based on the expression; and filtering the column associated with the second data from the second table based on a value identifier mapped to at least one vector of data representing the collected first data; and executing the query by at least scanning the second table based on the first predicate and the filtered column.

Example 18: The non-transitory computer-readable medium of example 17, wherein the transforming comprises: converting the second predicate to a child node of the table scan, wherein the table scan is configured to perform the scanning of the second table.

Example 19: The non-transitory computer-readable medium of example 18, wherein the transforming further comprises including the first predicate as a second child node of the table scan in conjunction with the dynamic predicate.

Example 20: The non-transitory computer-readable medium of any one of examples 17 to 19, wherein the collecting comprises parallelizing the first data; and wherein the applying further comprises merging, after the collecting, the first data.

FIG. 8 depicts an example of a database management system 100, in accordance with some example implementations.

The database management system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 8, the databases 190A-N represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-N, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the query execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-N. Specifically, the TableScan operator at Table 1 would result in a call for a dictionary look up for a column "X" for the value ID of "1" and an indexvector scan with a valueid obtained from the dictionary look up, which results in a document ID list that identifies one or more rows in the table 1. Then for each document ID, a call is made via 199 to look up the value IDs for columns A and B. The value IDs may be used to look up dictionary values to materialize, the columns A and B including the actual data values for those columns.

TABLE 1

| Operator | Calls made on Database API |
|---|---|
| 1) TableScan (Filter X = 1) | dictionary lookup column "X" for the value of ID of "1" indexvector scan with a valueid from the lookup, which results in a document ID (docid) list that identifies one or more rows in table "1". |
| 2) Materialization (Columns A, B) | For each docid, lookup value IDs (valueids) for columns A + B For the valueids, lookup dictionary value in dictionaries of A and B |

In some implementations, the query execution engine 112 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 112 may perform execution related to handling the differences between these two types of databases. This may enable a reduction in processing at the database layer 190A-N. Moreover, the query execution engine 112 may perform other operations including rule-based operations, such as joins and projections, as well as filtering, group by, multidimensional analysis, and/or the like to reduce the processing burden on the database layer. In this way, the query execution engine 112 may execute these and other complex operations, while the database's persistence/storage layer 190A-N can perform simpler operations to reduce the processing burden at the database's persistence/storage layer 190A-N.

In some example embodiments, the query execution engine 112 may run, as noted above, just-in-time code 127 generated for some query operations, while pre-compiled code 125 may be run for other operations. Moreover, the query execution engine 112 may combine the generated code 127 with pre-compiled code 125 to further optimize execution of query related operations. In addition, the query execution engine 112 may provide for a plan execution framework that is able to handle data chunk(s), pipelining, and state management during query execution. Furthermore, the query execution engine 112 may provide the ability to access table storage via an abstract interface to a table adapter, which may reduce dependencies on specific types of storage/persistence layers (which may enable use with different types of storage/persistence layers).

In some example embodiments, the database execution engine 150 may be provided with at least one table adapter. In some example embodiments, the table adapter may generate an object, such as a table object, which can be stored in cache with other code, objects, and/or the like awaiting runtime execution of the query. In some example embodiments, and the table object can be opened, during query execution, to provide access to a table stored in the persistence layer of a database.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system, comprising:
   at least one data processor; and
   at least one memory including instructions which when executed by the at least one processor cause operations comprising:
     receiving, via a query optimizer of a database execution engine, a structured query language (SQL) query from a user equipment, the SQL query including at least a join operator, a first predicate, and a second predicate;
     generating, using the query optimizer, a query plan for execution of the SQL query, wherein generating the query plan comprises:
       transforming the second predicate into a dynamic predicate, wherein the dynamic predicate includes at least one value list operator that references one or more values that are not known at compile time but are gathered at query execution time, and
       applying the dynamic predicate to at least first data, wherein the applying comprises parallelizing the first data; and
     executing, using a query execution engine of the database execution engine and based on executable code received from a query plan compiler, the query plan to execute the SQL query by at least the applying of the dynamic predicate to at least the first data,
   wherein each of the join operator and the at least one value list operator is a SOL operator executed at runtime of the SQL query, and wherein each of the first predicate, the second predicate, and the dynamic predicate is a logical expression evaluated at runtime of the SQL query to return a Boolean value based on data stored in one or more tables.

2. The system of claim 1, wherein the second predicate includes an expression associated with a first table.

3. The system of claim 2, wherein the second predicate includes a reference to a column associated with second data from a second table, and wherein the join operator references the first data from the first table and the second data from the second table.

4. The system of claim 1, wherein the operations further comprise implementing a semi-join reduction technique using the dynamic predicate.

5. The system of claim 4, wherein the semi-join reduction technique comprises a transformation to include a semi-join and a shared sub plan.

6. The system of claim 5, wherein the shared sub plan includes a build side and a probe side of the query plan.

7. The system of claim 6, wherein the build side includes one or more auxiliary structures to facilitate matching of rows between a first table and a second table on the probe side.

8. The system of claim 1, wherein the operations further comprise injecting the dynamic predicate into a table scan using a conjunction.

9. The system of claim 1, wherein the join operator references the first data from a first table and second data from a second table, and wherein the first predicate is used during a table scan of the second table.

10. The system of claim 1, wherein the first predicate is used to determine which rows in a first table and a second table are relevant to execution of the query.

11. A method comprising:

receiving, via a query optimizer of a database execution engine, a structured query language (SOL) query from a user equipment, the SQL query including at least a join operator, a first predicate, and a second predicate;

generating, using the query optimizer, a query plan for execution of the SOL query, wherein generating the query plan comprises:

transforming the second predicate into a dynamic predicate, wherein the dynamic predicate includes at least one value list operator that references one or more values that are not known at compile time but are gathered at query execution time, and applying the dynamic predicate to at least first data, wherein the applying comprises parallelizing the first data; and executing, using a query execution engine of the database execution engine and based on executable code received from a query plan compiler, the query plan to execute the SQL query by at least the applying of the dynamic predicate to at least the first data, wherein each of the join operator and the at least one value list operator is a SQL operator executed at runtime of the SQL query, and wherein each of the first predicate, the second predicate, and the dynamic predicate is a logical expression evaluated at runtime of the SQL query to return a Boolean value based on data stored in one or more tables.

12. The method of claim 11, wherein the second predicate includes an expression associated with a first table.

13. The method of claim 12, wherein the second predicate includes a reference to a column associated with second data from a second table, and wherein the join operator references the first data from the first table and the second data from the second table.

14. The method of claim 11, further comprising implementing a semi-join reduction technique using the dynamic predicate.

15. The method of claim 14, wherein the semi-join reduction technique comprises a transformation to include a semi-join and a shared sub plan.

16. The method of claim 15, wherein the shared sub plan includes a build side and a probe side of the query plan.

17. The method of claim 16, wherein the build side includes one or more auxiliary structures to facilitate matching of rows between a first table and a second table on the probe side.

18. The method of claim 11, further comprising injecting the dynamic predicate into a table scan using a conjunction.

19. The method of claim 11, wherein the join operator references the first data from a first table and second data from a second table, wherein the first predicate is used during a table scan of the second table.

20. A non-transitory computer-readable medium storing instructions, which when executed by at least one data processor, result in operations comprising:

receiving, via a query optimizer of a database execution engine, a structured query language (SQL) query from a user equipment, the SQL query including at least a join operator, a first predicate, and a second predicate;

generating, using the query optimizer, a query plan for execution of the SQL query, wherein generating the query plan comprises:

transforming the second predicate into a dynamic predicate, wherein the dynamic predicate includes at least one value list operator that references one or more values that are not known at compile time but are gathered at query execution time, and applying the dynamic predicate to at least first data, wherein the applying comprises parallelizing the first data; and executing, using a query execution engine of the database execution engine and based on executable code received from a query plan compiler, the query plan to execute the SOL query by at least the applying of the dynamic predicate to at least the first data, wherein each of the join operator and the at least one value list operator is a SQL operator executed at runtime of the SQL query, and wherein each of the first predicate, the second predicate, and the dynamic predicate is a logical expression evaluated at runtime of the SQL query to return a Boolean value based on data stored in one or more tables.

\* \* \* \* \*